United States Patent [19]

Myers

[11] Patent Number: 4,907,022
[45] Date of Patent: Mar. 6, 1990

[54] PHOTOGRAPHIC GUN

[76] Inventor: Jeff D. Myers, 6555 E. Mockingbird La., Paradise Valley, Ariz. 85253

[21] Appl. No.: 274,956

[22] Filed: Nov. 22, 1988

[51] Int. Cl.⁴ .............................................. G03B 29/00
[52] U.S. Cl. ..................................... 354/76; 354/288; 354/295
[58] Field of Search ..................... 354/75, 76, 81, 293, 354/295, 288

[56] References Cited

U.S. PATENT DOCUMENTS

| | | | |
|---|---|---|---|
| 624,693 | 5/1899 | Sheffield . | |
| 1,345,981 | 7/1920 | Bass . | |
| 1,395,869 | 11/1921 | Pickard et al. . | |
| 1,605,389 | 11/1926 | Brelsford . | |
| 2,140,050 | 12/1938 | Hart | 95/31 |
| 2,182,097 | 12/1939 | Schenk | 95/42 |
| 2,414,083 | 1/1947 | Borden | 88/16 |
| 3,545,356 | 12/1970 | Nielsen | 95/12 |
| 3,688,665 | 9/1972 | Herden | 95/12 |
| 3,709,124 | 1/1973 | Hunt | 95/12 |
| 3,785,261 | 1/1974 | Ganteaume | 95/12 |
| 3,827,061 | 7/1974 | Kellner | 354/195 |
| 3,877,048 | 4/1975 | Kellner | 354/195 |
| 4,202,115 | 5/1980 | Borel | 35/25 |
| 4,290,219 | 9/1981 | Boller et al. | 42/1 R |
| 4,415,250 | 11/1983 | Rossmann et al. | 354/195 |
| 4,630,911 | 12/1986 | Paul | 354/82 |

Primary Examiner—Michael L. Gellner
Attorney, Agent, or Firm—Warren F. B. Lindsley

[57] ABSTRACT

A hand held weapon simulating a rifle, shotgun or pistol having a camera pivotally mounted in the area of the usual projectile insertion and ejecting mechanism which has its shutter, focus and f adjustment means mounted in or adjacent the firing chamber which camera is actuated by trigger action of the weapon for taking pictures through the barrel of the weapon.

9 Claims, 1 Drawing Sheet

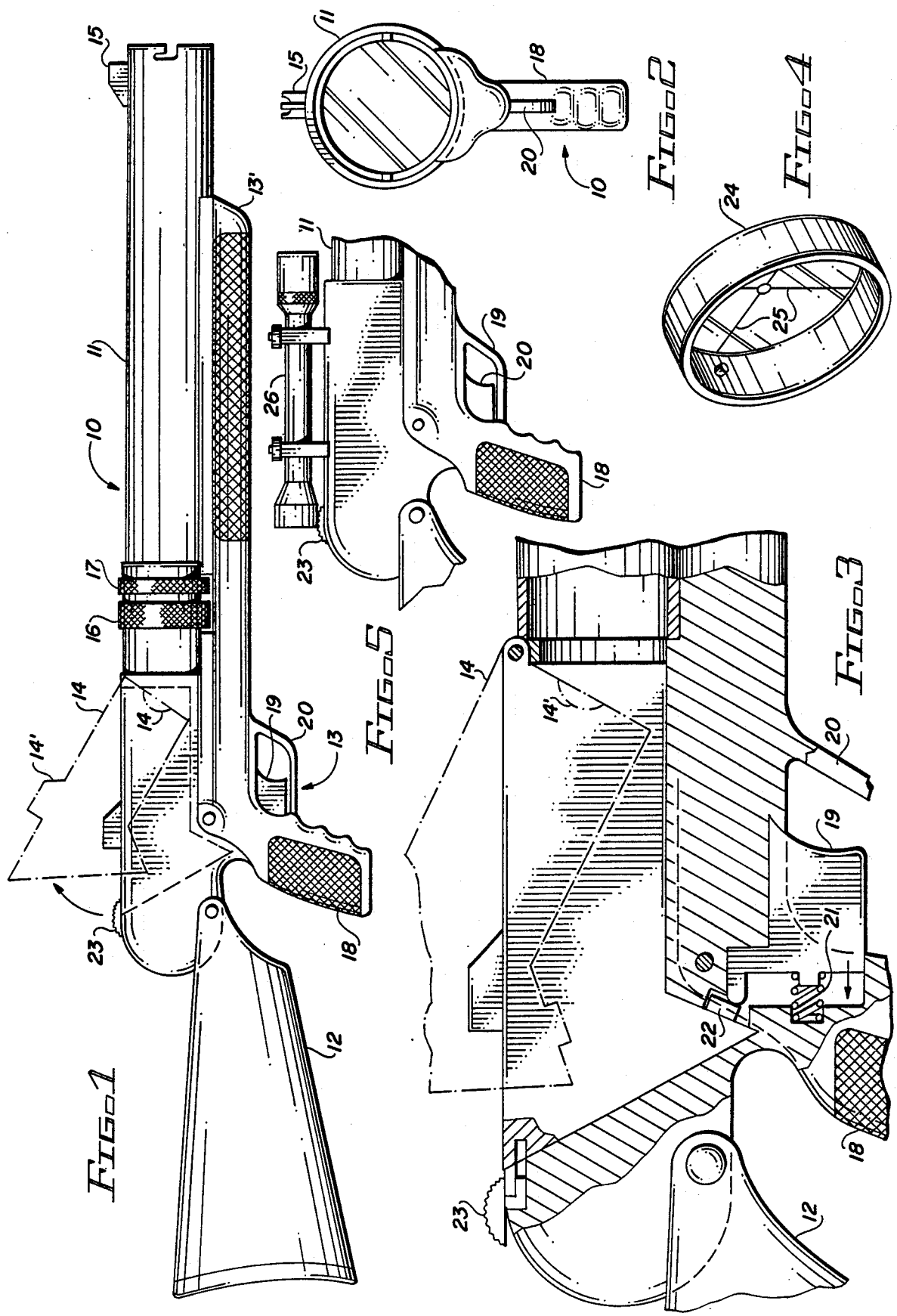

PHOTOGRAPHIC GUN

BACKGROUND OF THE INVENTION

Within comparatively recent years the indiscriminate slaughter of wild game has moved the devotees of the sport of hunting to insist upon such regulation, statutory or self-imposed as shall protect game birds and animals from extinction. In the extension of this idea many sportsmen deliberately reduce their chance of killing the game by substituting the rifle with its one missile for the shotgun with its widely scattering scores of deadly pellets.

The complete disappearance from the United States of several kinds of game birds and animals which formerly were abundant and the depletion of other species to almost the point of extinction has united the sportsmen of the country in an effort to check the further ravages of the meat hunter and those who find their pleasure in wholesale slaughter.

With such incentive to prevent the total destruction of the wild life of the country, sportsmen have worked actively to have suitable game laws passed in several states urging especially the protection of closed seasons for appropriate term of years in order to give vanishing species a chance to multiply.

All of this, however, is not enough to protect the game from extinction.

Accordingly, a need exists to provide the sportsmen with a satisfying option to game hunting with the intent to kill and still preserve the game.

DESCRIPTION OF THE PRIOR ART

Although many forms of weapons, such a rifles have been developed for hunting, none are known which shoots a picture of the game in a manner that simulates hunting with a rifle and provides a picture of the simulated kill and area of impact for trophy substitution.

SUMMARY OF THE INVENTION

In accordance with the invention claimed, a new and improved weapon of the rifle type is disclosed which simulates a kill by the hunter by photographing the exact area of impact on the game or around the game by rifle trigger action without discharging a bullet.

It is, therefore, one object of this invention to provide a new weapon such as a rifle that shoots a picture in place of firing a projectile.

Another object of this invention is to provide a new photo gun which simulates a weapon that employs a built in camera and scope.

A further objective of this invention is to provide a new and improved non-firing, non-killing photographic hunting rifle.

A still further object of this invention is to provide a camera mounted hand held weapon that when fired after sighting along or through the barrel of the weapon by trigger action, takes a cross hair picture of the game sighted.

A still further object of this invention is to provide a new and improved hand held weapon that houses in the body of the weapon a photographic apparatus and a telephoto lens in its barrel.

Further objects and advantages of the invention will become apparent as the following description proceeds and the features of novelty which characterize this invention will be printed out with particularity in the claims annexed to and forming a part of this specification.

BRIEF DESCRIPTION OF THE DRAWING

This invention may be more readily described by reference to the accompanying drawing, in which:

FIG. 1 is a plan view of a hand held weapon embodying the invention and showing a pivotal camera therein in dash lines;

FIG. 2 is a right end view of FIG. 1;

FIG. 3 is an enlarged partial view of FIG. 1 showing more detail of the camera mounted assembly;

FIG. 4 is a perspective view of a cross hair lens for mounting on the open end of the hand held weapon; and FIG. 5 is a partial view of a modification of the weapon shown in FIG. 1 and illustrating a scope mounted on the top of the barrel immediate the gun stock of the weapon.

DESCRIPTION OF THE PREFERRED EMBODIMENT

Referring more particularly to the drawing by characters of reference, FIG. 1 discloses a hand held weapon such as a shotgun or rifle 10 with the usual barrel 11, gun stock 12 and trigger assembly 13 mounted on a frame 13' and having built into the rifle at a point where the projectile firing rifle normal employs a projectile insertion and ejection mechanism (which is omitted) a camera 14 and camera shutter 14'. The weapon in all other respects may simulate a projectile firing weapon except that barrel 11, having a firing chamber and a sight 15 at its end, may have built into the barrel a focus and f stop adjustment rings 16 and 17, respectively which are adjustable by rings mounted around the outside of the barrel for control purposes. The adjustment rings form a part of the photographic or camera components.

The primary feature of the camera equipment's adjustment rings is to permit the image sighted along the barrel of the weapon to be focused until the instant of exposure. It should be noted that focus and aperture (f stop) settings may be accomplished automatically and still fall within the scope of this invention.

As noted, the rifle further comprises a hand grip mechanism 18 including a trigger 19 and its trigger guard 20. Trigger 19 is biased by a spring 21 which when the trigger is compressed by finger action, engages a button 22 on camera 14 which triggers a shutter in camera 14 to expose the film therein to take a picture in the known normal manner.

As shown in FIGS. 1 and 3, camera 14 is built into the gun so as to lie flush within the outline of the gun when in position for use and is pivotally mounted to move outwardly of the outline of the gun to expose the camera for film removal purposes. Camera 14 is held in place in the rifle by a finger action latch 23 which interlockingly engages the camera when in one position and releases it for pivotal movement in another position.

Thus, a photo action weapon is disclosed which takes a picture through the barrel of a weapon, such as a shotgun or rifle, of game while the game is sighted through a sight 14' in the camera or along the barrel in the normal manner. The camera is triggered by trigger action of the weapon.

To further simulate the hunt a see through cap 24 having a cross hair configuration 25 arranged therein, as shown in FIG. 4, through which the picture is taken is attached to the end of panel 11. Thus the picture when taken and developed will not only show the game sighted, but will also show the cross hair configuration superimposed thereon.

FIG. 5 discloses a modification of the weapon system shown in FIGS. 1-6 wherein rifle 11 employing camera 14 may additionally have a well known scope 26 mounted on the top of the gun and particularly the camera for sighting the game in a normal manner. In this instance sight 14' may or may not comprise a part of camera 14.

Although but two embodiments of the invention have been shown and claimed, it will be apparent to those skilled in the art that various changes and modifications may be made therein without departing from the spirit of the invention or from the scope of the appended claims.

What is claimed is:

1. A simulated weapon for taking photographic pictures of game sighted with the weapon comprising:
   a gun,
   a hand grip mounted on said frame,
   a trigger mounted on said frame adjacent to hand grip,
   a hollow elongated barrel mounted on said frame and having a simulated firing chamber,
   a camera comprising a shutter mounted on said frame adjacent said trigger,
   said camera is pivotally mounted on said frame for movement to and from said firing chamber and
   Means connected to said trigger for actuating the shutter of said camera upon the application of a predetermined pressure to said trigger,
   said camera taking a picture of the game sighted by a user through said barrel of the weapon.

2. The simulated weapon set forth in claim 1 in further combination with:
   a see through cap mounted on the end of said barrel,
   said cap having a pair of hair lines for use in sighting the game.

3. The simulated weapon set forth in claim 1 wherein:
   said camera when moved away from said firing chamber being exposed to film changing purposes.

4. The simulated weapon set forth in claim 1 wherein:
   said camera is provided with means mounted in said barrel for focusing and f stop setting purposes.

5. The simulated weapon set forth in claim 4 wherein:
   said focusing and f stop settings are accomplished automatically by the camera.

6. The simulated weapon set forth in claim 4 wherein:
   said means for focusing and f stop setting purposes comprises control rings mounted around said barrel.

7. The simulated weapon set forth in claim 1 wherein:
   said gun comprises a rifle.

8. The simulated weapon set forth in claim 1 wherein:
   said gun comprises a shotgun.

9. The simulated weapon set forth in claim 1 in further combination with:
   a scope mounted on said camera for sighting the game therethrough.

* * * * *

UNITED STATES PATENT OFFICE
CERTIFICATE OF CORRECTION

Patent No. 4,907,022   Dated   March 6, 1990

Inventor(s)   JEFF D. MYERS

It is certified that error appears in the above-identified patent and that said Letters Patent is hereby corrected as shown below:

Claim 1, after line 3 and before line 4, insert the phrase ---said gun comprising frame,---

Signed and Sealed this

Nineteenth Day of March, 1991

*Attest:*

HARRY F. MANBECK, JR.

*Attesting Officer*   *Commissioner of Patents and Trademarks*